United States Patent
Kurtz

(10) Patent No.: US 6,811,912 B2
(45) Date of Patent: Nov. 2, 2004

(54) SOLID STATE FUEL CELL MADE FROM POROUS AND PARTIALLY POROUS SEMICONDUCTOR STRUCTURES

(75) Inventor: Anthony D. Kurtz, Ridgewood, NJ (US)

(73) Assignee: Kulite Semiconductor Products, Inc.

( * ) Notice: Subject to any disclaimer, the term of this patent is extended or adjusted under 35 U.S.C. 154(b) by 162 days.

(21) Appl. No.: 10/085,387

(22) Filed: Feb. 28, 2002

(65) Prior Publication Data
US 2003/0162069 A1 Aug. 28, 2003

(51) Int. Cl.$^7$ ................................................. H01M 8/10
(52) U.S. Cl. .............................. 429/30; 429/32; 429/33; 429/40
(58) Field of Search .............................. 429/30, 32, 33, 429/40

(56) References Cited

U.S. PATENT DOCUMENTS

| | | | | |
|---|---|---|---|---|
| 5,885,727 A | * | 3/1999 | Kawatsu ....................... | 429/17 |
| 6,272,929 B1 | | 8/2001 | Kurtz et al. .................. | 73/727 |
| 6,327,911 B1 | | 12/2001 | Kurtz et al. .................. | 73/727 |
| 2003/0044674 A1 | * | 3/2003 | Mallari et al. ................. | 429/44 |

OTHER PUBLICATIONS

Bernard J. Crowe, NASA SP–5115, "Fuel Cells—A Survey", 1973.
Charles Wardell, "Dreams of the New Power Grid—A Fuel Cell in Every Home . . . ", Popular Science, p. 61, Mar. 2002, vol. 260, No. 3.

* cited by examiner

Primary Examiner—Dah-Wei Yuan
(74) Attorney, Agent, or Firm—Plevy & Howard, PC

(57) ABSTRACT

A solid state fuel cell is fabricated from three substructures. There is a porous anode made from n+ silicon which is surrounded by a non-porous ring. The pore size of the anode material is sufficiently large to allow hydrogen gas to flow through and is of a sufficiently high conductivity to easily permit current flow of electrons. One side of the anode has enlarged pores and a layer of titanium and platinum is sputtered or otherwise deposited on the surface with the enlarged pores to produce a coated surface. A cathode is made in a similar manner and is fabricated as the anode. There is a center electrolytic section made from a low conductivity silicon or silicon carbide. The center electrolytic section has the coated side of the anode secured to one side and has the coated side of the cathode secured to the other side. The other or un-coated face of both the anode and the cathode has an electrical contact secured thereto to permit electrons to leave the anode and to reenter the cathode. The electrolytic center structure is filled with an ionic conductor. In this manner, hydrogen is broken into ions and electrons. The electrons cause a current flow, while the ions react with oxygen and produce water which is discharged from the fuel cell as steam or vapor.

19 Claims, 2 Drawing Sheets

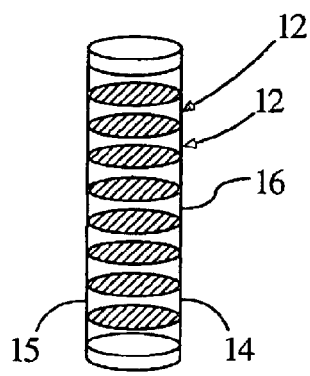
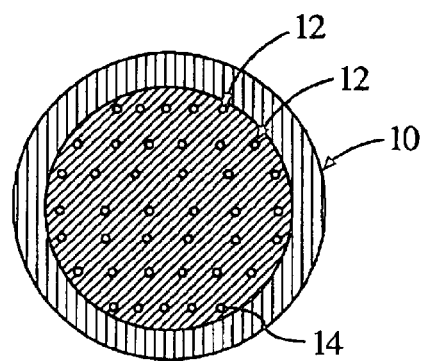
FIGURE 1A
FIGURE 1B
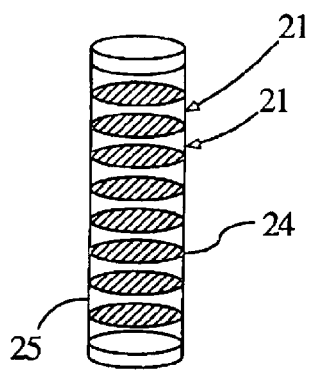
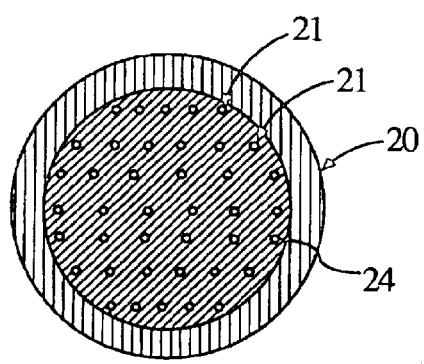
FIGURE 2A
FIGURE 2B
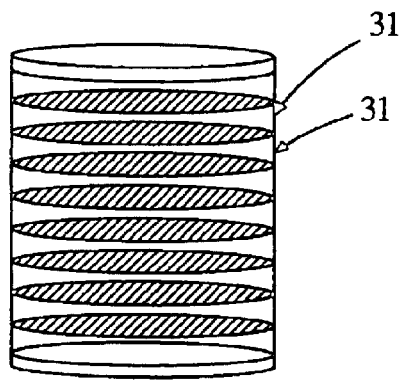
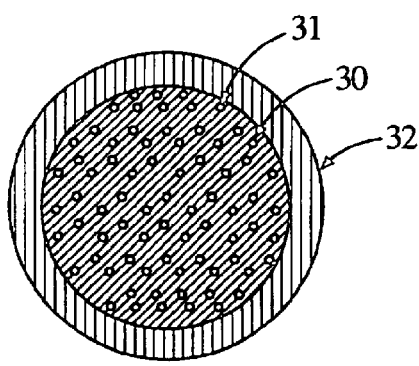
FIGURE 3A
FIGURE 3B

SOLID STATE FUEL CELL MADE FROM POROUS AND PARTIALLY POROUS SEMICONDUCTOR STRUCTURES

FIELD OF INVENTION

This invention relates to an all solid state fuel cell structure and more particularly to a fuel cell made from a series of porous and partially porous semiconductor structures employing silicon and/or silicon carbide.

BACKGROUND OF THE INVENTION

Like the conventional dry cell and lead acid batteries, fuel cells work by virtue of electrochemical reactions in which the molecular energy of the fuel and an oxidant are transformed into direct current electrical energy. Fuel cells do not consume chemicals that form part of their structure or as stored within a structure. They react with fuels supplied from outside the cell. Since the fuel cell itself does not undergo an irreversible chemical change, it can continue to operate as long as its fuel and oxidant are supplied and byproducts removed, or at least until electrodes cease to operate because of mechanical or chemical deterioration.

A fuel cell basically consists of a container of an electrolyte. For example, the electrolyte can be a water solution of an acid, such as phosphoric acid, or a similar acid. In this solution are immersed two porous electrodes and through these the reactants, as hydrogen and oxygen, are brought into contact with the electrolyte. The hydrogen and oxygen react to release ions and electrons, and water is produced. The electrons are made to do useful work in an external circuit, whereas the ions flow from one electrode to the other to complete the internal circuit in the cell. The operation of fuel cells is very well understood. See, for example, a publication by NASA entitled, "Fuel Cells—A Survey", NASA SP-5115 published in 1973. Every fuel cell uses an input fuel which is catalytically reacted (electrons removed from the fuel elements) in the fuel cell to create an electric current. Every fuel cell consists of an electrolyte material which is sandwiched between two porous electrodes as the anode and cathode. The input fuel passes through the anode (oxygen through the cathode) where it is split into ions and electrons. The electrons go through an external circuit while the ions move through the electrolyte to the oppositely charged cathode. At the cathode, the ions combine with oxygen to form $H_2O$ and depending on the fuel, carbon dioxide ($CO_2$).

Thus, at the anode $H_2 \rightarrow 2H^+ + 2e^-$ and at the cathode

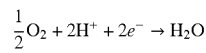

In most fuel cells platinum, which coats both the anode and cathode, the side adjacent to the electrolyte serves as a catalyst for the oxidation and reduction processes. Fuel and oxidant gases are supplied to the back of the anode and the cathode respectively, and both the anode and cathode are electrically conductive. Fuel is supplied to the backside of the anode and oxygen is supplied to the backside of the cathode. In addition, both on the anode and on the cathode side there is an exit hole to permit the egress of either fuel or extra oxygen and on the cathode side (the reaction byproducts), as water (as steam) and/or carbon dioxide $CO_2$. Thus, fuel cells are very well known and operation is continued to be improved. See, for example, an article in Popular Science, March 2002, Volume 260, No. 3, page 61 entitled, "Dreams of the New Power—A Fuel Cell in Every Home". That article describes the problems with fuel cells, as well as the operation of fuel cells and the attempt to reduce the costs of fuel cells.

It is therefore an object of the present invention to provide an improved fuel cell which is all solid state and which fuel cells exhibit improved high temperature operation.

SUMMARY OF INVENTION

A solid state fuel cell is fabricated from three substructures. There is a porous anode made from n+ silicon which is surrounded by a non-porous ring. The pore size of the anode material is sufficiently large to allow hydrogen gas to flow through and is of a sufficiently high conductivity to easily permit current flow of electrons. One side of the anode has enlarged pores and a layer of titanium and platinum is sputtered or otherwise deposited on the surface with the enlarged pores to produce a coated surface. A cathode is made in a similar manner and is fabricated as the anode. There is a center electrolytic section made from a low conductivity silicon or silicon carbide. The center electrolytic section has the coated side of the anode secured to one side and has the coated side of the cathode secured to the other side. The other or un-coated face of both the anode and the cathode has an electrical contact secured thereto to permit electrons to leave the anode and to reenter the cathode. The electrolytic center structure is filled with an ionic conductor. In this manner, hydrogen is broken into ions and electrons. The electrons cause a current flow, while the ions react with oxygen and produce water which is discharged from the fuel cell as steam or vapor.

BRIEF DESCRIPTION OF THE FIGURES

FIG. 1 consists of FIGS. 1A and 1B and shows a side and front view of an anode structure utilizing this invention.

FIG. 2 consists of FIGS. 2A and 2B and shows a side and front view of a cathode structure used in this invention.

FIG. 3 consists of FIGS. 3A and 3B and shows a side and front view of an electrolyte structure used in this invention.

DETAILED DESCRIPTION OF THE FIGURES

Figure 4:
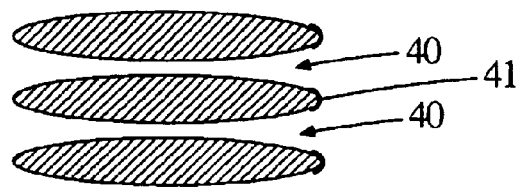
FIG. 4 is an enlarged view depicting the nature of the coated pores utilized for the cathode and anode structures.

Referring to FIG. 1, there is shown a side view in FIG. 1A of a porous anode according to this invention. FIG. 1B depicts a front view of the porous anode of this invention. The porous anode of FIG. 1 is made from n+ silicon which is surrounded by a core 10 on a nonporous ring. The pore size of the anode material is sufficiently large to easily allow hydrogen gas to flow through it and is of a sufficiently high conductivity to easily permit flow by electrons. As seen in FIG. 1A, the pore size of the anode has an enlarged pore opening on the front surface 14. As seen, the shape of the pore is basically a large aperture at surface 14 where the hole continues to the back surface 15 and decreases in diameter. The pores are also shown in FIG. 1B based on revealing them from the surface 14. The large portion of the pore 12 is shaped in a conical manner and a layer of titanium and platinum is sputtered or otherwise deposited on the surface 14 with the enlarged pores. The enlarged pores, as indicated, are shaped in a conical manner such that the sputtered titanium-platinum essentially covers the entire surface containing the enlarged pores. Thus, as seen in FIG. 1A, surface 14 would be covered by a layer 16 of titanium-platinum. The thickness of the sputtered layer of titanium-platinum is on the order of 2000 to 4000 Angstroms. As one can ascertain, the porous anode can be fabricated from n+ silicon or from silicon carbide. The pores are created in the silicon or silicon carbide by etching or other typical conventional processing techniques and the formation of apertures or pores in silicon or in silicon carbide is well known. The processing of silicon and silicon carbide are well known. See U.S. Pat. No. 6,327,911 entitled, "High Temperature Pressure Transducer Fabricated from Beta Silicon Carbide" issued on Dec. 11, 2001 to A. D. Kurtz et al. and is assigned to the assignee herein. See also U.S. Pat. No. 6,272,929 entitled, "High Pressure Piezoresistive Transducer Suitable for Hostile Environments" issued on Aug. 14, 2001 to A. D. Kurtz et al. and assigned to the assignee herein. There are many patents assigned to Kulite that show the treatment of both silicon and silicon carbide to form apertures, pores, channels and so on.

Referring to FIG. 2, there is shown in FIG. 2A a side view of a cathode structure, while FIG. 2B shows the front view of the cathode structure. As seen, the cathode structure is also surrounded by a nonporous ring 20 having a central portion 24 which has a plurality of pores 21 fabricated therein. The pores 21, as in the anode, also are conically shaped and have a larger opening on the front surface 24 which tapers to a smaller opening on the back surface 25. Essentially the cathode is made in a similar manner as the anode and is also fabricated from n+ silicon or silicon carbide. The pores, as indicated, are dispersed across the surface 24 and are fabricated by typical etching techniques. The conical shape of the pores is easily ascertained as one can obtain etchants which will basically etch in the manner shown to form the aperture shown.

Referring to FIG. 3, there is shown electrolyte section 30 which is made from silicon and also has a non-porous ring 32 surrounding the same. The electrolyte section is made from a low conductivity silicon or silicon carbide and as one can see, it has a much smaller pore size than the anode or cathode. The conductivity of the electrolyte section is substantially less (10 times) than the conductivity of the cathode and anode. The pores 31 are approximately ¼ to ½ or smaller than the size of the pores in the anode and cathode.

Referring to FIG. 4, there is shown an enlarged view of the pores as fabricated in the anode or cathode. As one can see, the pores 40 have an enlarged opening in the front. The pores 40 and the entire face of the wafer or substrate are coated with a titanium-platinum overcoat. The titanium-platinum acts as a catalyst. It is shown clearly that the layer of titanium-platinum 41 coats the surface of the pores with little titanium-platinum located in the aperture. Essentially, the pores in the anode and cathode are wide enough to let oxygen or hydrogen through. The pores of the anode can also be of the same size as the pores in the cathode and are sized to let input fuel through and are also coated with titanium-platinum. The pores in the anode and cathode do not have to be of the same size.

Figure 5:
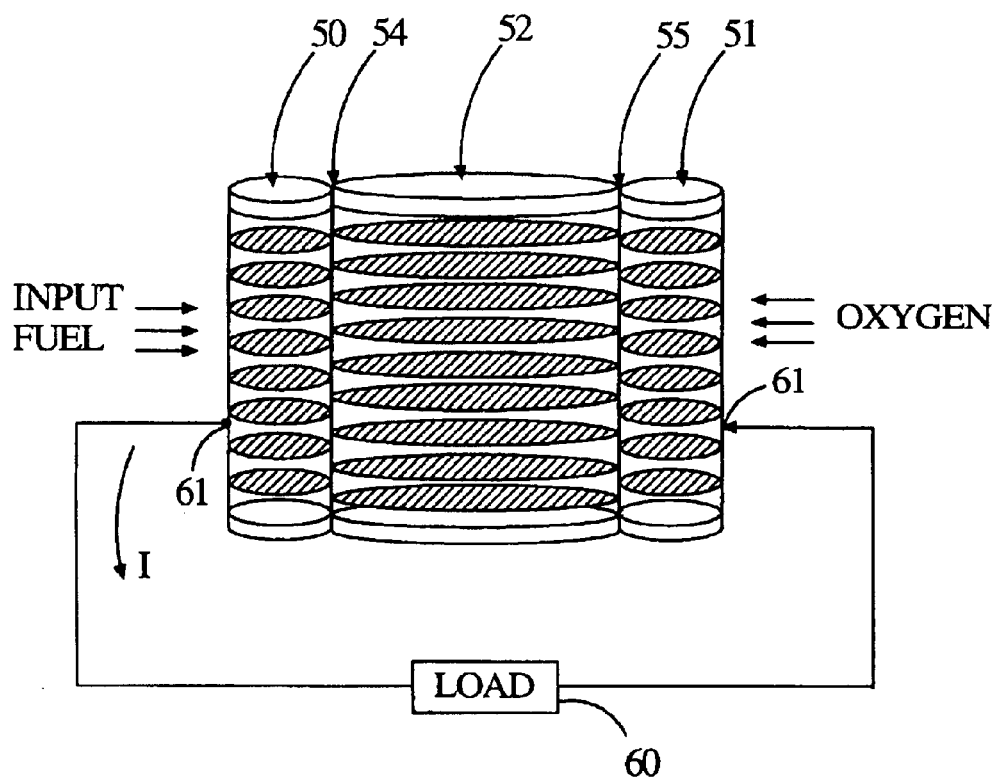
FIG. 5 shows an assembled fuel cell end circuit operating with a load to provide a current through the load upon fuel cell operation.

Shown at FIG. 5 is the assembled fuel cell. As one can see, the anode structure designated by reference numeral 50 is located on the left while the cathode structure 51 is on the right. The electrolytic structure 52 is in the center. The coated surface 54 of the anode 50 is secured to the left front surface of the electrolyte 52, while the coated surface 55 of the cathode 51 is secured to the right side surface of the electrolyte 52. The surfaces can be secured by means of metallic bonds or other techniques. The input fuel which is, for example, hydrogen, is directed to the left side of the fuel cell while oxygen or air is directed to the right side of the fuel cell. The fuel cell converts the hydrogen into hydrogen ions and electrons as is well known in fuel cell operation. The conversion allows the electrons from the hydrogen to flow through the load 60 to thereby produce a current through the load as in conventional fuel cell operation. The platinum catalyst of the cell separates the hydrogen into ions which have a positive charge and electrons which are negatively charged. The hydrogen ions mate with oxygen from the air and exit as water vapor or steam. The water vapor is typically collected as a run off from the cell. The electrons, which are basically repelled by the cell, are collected to produce an electric current and flow through the load 60. As seen from FIG. 5, the fuel cell is made from three structures with the coated surface of the anode structure in contact with one face of the electrolyte structure 52 and the coated surface of the cathode structure is in contact with the other face of the electrolyte structure. Each coated face of the anode and cathode is attached or otherwise fastened to the non-porous electrolyte structure to receive on the anode side the fuel, such as gaseous hydrogen, and on the cathode side to permit the entrance of air or oxygen. Electrical contacts 61 are made to both the anode and cathode to permit electrons to leave the anode and later to reenter the cathode. The electrolyte structure 52 is filled with an ionic conductor, such as phosphoric acid or any other convenient ionic conductor. This is introduced by having the entire cell immersed in the ionic conductor or having a portion of the cell immersed in the conductor. Most previous fuel cells use various organic materials for the anode, the cathode and the electrolytic structure. However, in this case, the use of silicon and/or silicon carbide for the basic substructures permits operation at much higher temperatures. Another significant advantage is the ability to create a large catalyst area for both the anode and the cathode with a minimum volume of platinum. This increases the efficiency but, also lowers the cost. The nature of the process used to form the various pore structures permits the easy design of a wide range of pore diameters to also employ maximum efficiency for each section as well as to reduce cost. Thus, as indicated, the pores are fabricated in the silicon or silicon carbide by use of photolithographic techniques and convenient etchants as acids. The acids which selectively etch will etch at a greater rate at the top and therefore a produce a large input opening tapering to a smaller diameter pore. Based on the process, a different pore size can be made as desired for the anode, the cathode and the electrolyte substructures. This would inherently increase efficiency and operation of the fuel cell. While the above fuel cell described operation with hydrogen, it is, of course, understood that there are many potential fuels which include many of the hydrocarbons such as methane, ethane, acetylene, as well as compromise fuels, such as hydrazine, ammonia, methanol. See the prior art publication for typical and well known fuels. The difficulties encountered with the hydrocarbons have prompted the investigation of compromised fuels and essentially there are many ways of using hydrogen for fuel cell operation. It is understood that the above describes a single fuel cell or wafer fabricated from silicon or silicon carbide. Such cells or wafers can be assembled into a stack to create a fuel battery. The stacking can be sequential or a back to back stack. The cells can be electrically coupled in series as anode to cathode and so on, or in parallel for large current operation as anode to anode, cathode to cathode. These techniques are well known.

It is understood that there are many alternative embodiments which can be envisioned by one skilled in the art. Basically the major aspect of the present invention is to provide a method and apparatus for an all solid state fuel cell structure which can be fabricated from silicon or silicon carbide and therefore can be capable of operating at extremely high temperatures.

What is claimed is:

1. A solid state fuel cell, comprising:
   a planar semiconductor anode structure of a given conductivity having a plurality of pores each of a given diameter directed from a first surface to a second surface, with said first surface coated with a metallic catalyst;
   a planar semiconductor cathode structure of a given conductivity having a plurality of pores each of a predetermined diameter directed from a first surface to a second surface, with said first surface coated with a metallic catalyst; and
   an electrolyte planar semiconductor structure having a plurality of pores directed from a first surface to a second surface, with said metallized surface of said anode structure coupled to said first surface of said electrolyte structure with said metallized surface of said cathode structure coupled to said second surface of said electrolyte structure wherein said electrolyte structure is fabricated from silicon.

2. The fuel cell according to claim 1 wherein said anode and cathode are fabricated from silicon and each is surrounded by a non-porous peripheral structure of silicon.

3. The fuel cell according to claim 1 wherein said anode pores are of a different diameter than said cathode pores.

4. A solid state fuel cell, comprising:
   a planar semiconductor anode structure of a given conductivity having a plurality of pores each of a given diameter directed from a first surface to a second surface, with said first surface coated with a metallic catalyst;
   a planar semiconductor cathode structure of a given conductivity having a plurality of pores each of a predetermined diameter directed from a first surface to a second surface, with said first surface coated with a metallic catalyst; and
   an electrolyte planar semiconductor structure having a plurality of pores directed from a first surface to a second surface, with said metallized surface of said anode structure coupled to said first surface of said electrolyte structure with said metallized surface of said cathode structure coupled to said second surface of said electrolyte structure wherein said pores of said anode and cathode have an enlarged opening portion at said first surface tapering to a smaller opening at said second surface.

5. The fuel cell according to claim 4 wherein said pores of said electrolyte are smaller than the pores of either said anode or cathode.

6. The fuel cell according to claim 4 wherein said electrolyte is fabricated from a low conductivity semiconductor as compared to the conductivity of said anode and cathode.

7. The fuel cell according to claim 4 wherein said given conductivity of said anode and cathode is n+ conductivity.

8. The fuel cell according to claim 4 wherein said metallic catalyst is platinum.

9. The fuel cell according to claim 4 wherein said metallic catalyst is titanium-platinum.

10. The fuel cell according to claim 4 wherein said metallized surface is to a depth of between 2000 to 4000 Angstroms.

11. The fuel cell according to claim 4 wherein said second surface of said anode and cathode each has an electrical contact found thereon.

12. The fuel cell according to claim 4 wherein said pores of said electrolyte are filled with an ionic conductor.

13. The fuel cell according to claim 4 wherein said ionic conductor is phosphoric acid.

14. The fuel cell according to claim 4 wherein said anode pores are of approximately the same diameter as said cathode pores.

15. The fuel cell according to claim 4 wherein said second surface of said anode is adapted to receive hydrogen gas.

16. The fuel cell according to claim 4 wherein said second surface of said cathode is adapted to receive oxygen.

17. The fuel cell according to claim 4 wherein said anode, cathode and electrolyte structures are fabricated from silicon.

18. The fuel cell according to claim 4 wherein said anode, cathode and electrolyte structures are fabricated from silicon carbide.

19. The fuel cell according to claim 15 wherein said fuel cell uses a hydrocarbon fuel such as methane, ethane, acetylene, butane and so on to provide hydrogen to said anode.

* * * * *